(12) United States Patent
Eggleston et al.

(10) Patent No.: US 8,719,662 B2
(45) Date of Patent: *May 6, 2014

(54) MEMORY DEVICE WITH ERROR DETECTION

(75) Inventors: David Eggleston, San Jose, CA (US); Bill Radke, San Francisco, CA (US)

(73) Assignee: Micron Technology, Inc., Boise, ID (US)

( * ) Notice: Subject to any disclaimer, the term of this patent is extended or adjusted under 35 U.S.C. 154(b) by 625 days.

This patent is subject to a terminal disclaimer.

(21) Appl. No.: 13/007,923

(22) Filed: Jan. 17, 2011

(65) Prior Publication Data

US 2011/0113306 A1    May 12, 2011

Related U.S. Application Data

(63) Continuation of application No. 12/425,867, filed on Apr. 17, 2009, now Pat. No. 7,877,669, which is a continuation of application No. 11/219,535, filed on Sep. 1, 2005, now Pat. No. 7,523,381.

(51) Int. Cl.
*G11C 29/00* (2006.01)

(52) U.S. Cl.
USPC .......................................... 714/764; 714/773

(58) Field of Classification Search
USPC ........................................ 714/763, 764, 773
See application file for complete search history.

(56) References Cited

U.S. PATENT DOCUMENTS

| | | |
|---|---|---|
| 5,379,262 A | 1/1995 | Okamoto et al. |
| 5,418,752 A * | 5/1995 | Harari et al. ................. 365/218 |
| 5,603,001 A | 2/1997 | Sukegawa et al. |
| 5,611,067 A | 3/1997 | Okamoto et al. |
| 5,715,193 A | 2/1998 | Norman |
| 5,768,560 A | 6/1998 | Lieberman et al. |
| 5,781,918 A | 7/1998 | Lieberman et al. |
| 5,920,501 A | 7/1999 | Norman |
| 5,930,815 A | 7/1999 | Estakhri et al. |
| 5,966,724 A | 10/1999 | Ryan |
| 5,987,573 A | 11/1999 | Hiraka |
| 6,000,006 A | 12/1999 | Bruce et al. |
| 6,130,837 A | 10/2000 | Yamagami et al. |
| 6,426,893 B1 | 7/2002 | Conley et al. |
| 6,651,212 B1 * | 11/2003 | Katayama et al. ............ 714/763 |
| 6,680,870 B2 | 1/2004 | Toyama et al. |
| 6,754,765 B1 | 6/2004 | Chang et al. |
| 6,769,087 B2 | 7/2004 | Moro et al. |
| 6,831,865 B2 | 12/2004 | Chang et al. |
| 6,859,856 B2 | 2/2005 | Piau et al. |
| 6,868,007 B2 | 3/2005 | Hasegawa et al. |
| 6,978,342 B1 | 12/2005 | Estakhri et al. |
| 7,012,835 B2 | 3/2006 | Gonzalez et al. |
| 7,350,044 B2 | 3/2008 | Keays |

(Continued)

OTHER PUBLICATIONS

"Flash Memory 0neNAND Specification", 126 pgs.

(Continued)

*Primary Examiner* — James C Kerveros
(74) *Attorney, Agent, or Firm* — Schwegman, Lundberg & Woessner, P.A.

(57) ABSTRACT

Data move operations in a memory device are described that enable identification of data errors. Error detection circuitry in the memory device can be operated using parity data or ECC data stored in the memory. Results of the error detection can be accessed by a memory controller for data repair operations by the controller.

33 Claims, 3 Drawing Sheets

(56) References Cited

U.S. PATENT DOCUMENTS

| | | |
|---|---|---|
| 7,362,611 B2 | 4/2008 | Roohparvar |
| 7,523,381 B2 | 4/2009 | Eggleston et al. |
| 7,877,669 B2 | 1/2011 | Eggleston et al. |
| 8,051,339 B2 * | 11/2011 | Sung et al. .............. 714/710 |
| 2001/0023472 A1 | 9/2001 | Kubushiro et al. |
| 2001/0052102 A1 | 12/2001 | Roohparvar |
| 2004/0003168 A1 | 1/2004 | Kim et al. |
| 2005/0080986 A1 | 4/2005 | Park |
| 2005/0172207 A1 | 8/2005 | Radke et al. |
| 2006/0018159 A1 | 1/2006 | Picca et al. |
| 2006/0050576 A1 | 3/2006 | Kim |
| 2006/0120166 A1 | 6/2006 | Kim et al. |
| 2006/0227602 A1 | 10/2006 | Houma et al. |
| 2006/0242485 A1 | 10/2006 | Roohparvar |
| 2007/0061672 A1 | 3/2007 | Eggleston et al. |
| 2009/0204871 A1 | 8/2009 | Eggleston et al. |

OTHER PUBLICATIONS

"Samsung Targets Embedded Space with OneNAND Flash", Innovation OneNAND, e-brochure at Samsung.com; http://www.samsung.com/Products/Semiconductor/Support/ebrochure/memory/samsung_innovation_onenand_051102.pdf, (Nov. 2005), 1 pg.

\* cited by examiner

MEMORY DEVICE WITH ERROR DETECTION

RELATED APPLICATION

This application is a Continuation of U.S. application Ser. No. 12/425,867, filed on Apr. 17, 2009, now issued as U.S. Pat. No. 7,877,669, which is a Continuation of U.S. application Ser. No. 11/219,535 filed Sep. 1, 2005, now issued as U.S. Pat. No. 7,523,381, which applications are incorporated herein by reference in their entireties.

FIELD OF THE INVENTION

The present invention relates to memory devices and more particularly to non-volatile memory internal data move operations.

BACKGROUND

Error detection and correction (ECC) engines are well known to those skilled in the art. An ECC engine is a device which performs a process of detecting for error and correcting errors to ensure the accuracy and integrity of data during a data transmission. Different ECC engines are based on Hamming Codes, Reed-Solomon Codes or other techniques to correct for data errors.

In memory systems a memory controller typically writes data and ECC data to a memory device. The ECC data is used by the controller during a read operation to identify and correct errors that may have occurred since the data was written to the memory.

Memory devices can be categorized in two broad areas as volatile and non-volatile. Volatile memory devices require power to maintain data, while non-volatile memories are capable of maintaining data in the absence of a power supply.

DESCRIPTION

In the following detailed description of the invention, reference is made to the accompanying drawings which form a part hereof, and in which is shown, by way of illustration, different embodiments in which the invention may be practiced. These embodiments are described in sufficient detail to enable those skilled in the art to practice the invention. Other embodiments may be utilized and structural, logical, and electrical changes may be made without departing from the scope of the present invention.

The following detailed description is, therefore, not to be taken in a limiting sense, and the scope of the present invention is defined only by the appended claims, along with the full scope of equivalents to which such claims are entitled.

Embodiments of the present invention can include a semiconductor memory device having an array of memory cells. The memory cells are non-volatile, and can be charge trapping cells such as floating gate transistors or NROM cells, phase-change memory cells such as chalcogenide cells, programmable conductor random access memory (PCRAM), latching cells such as SRAM, or magnetic random access memories (MRAM's). In addition, the memory cells can store one or more bits per cell.

Figure 1:
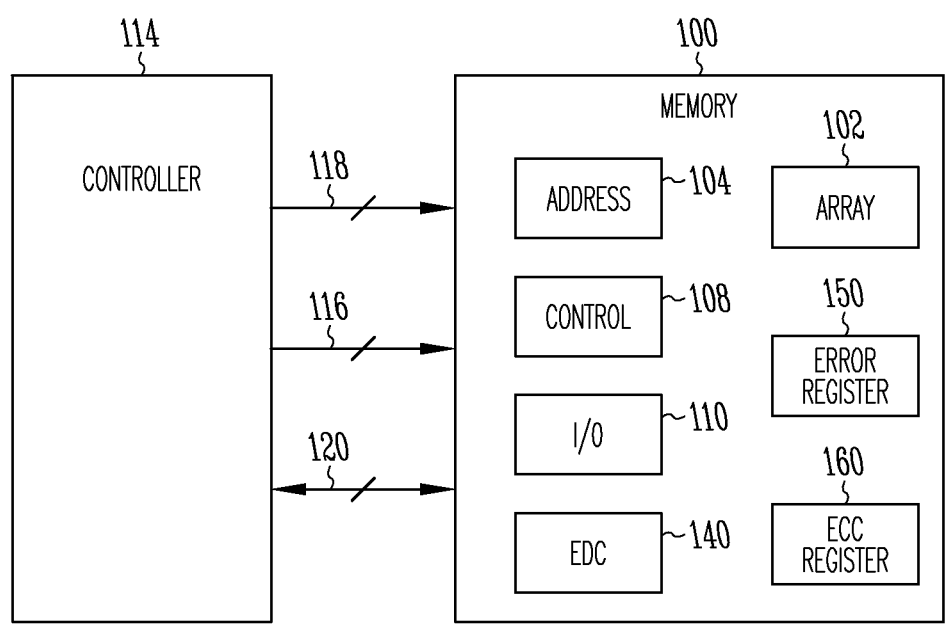
FIG. 1 is a block diagram of a memory system according to an embodiment of the invention.

FIG. 1 is a simplified block diagram of an integrated circuit dynamic memory device 100 in accordance with an embodiment of the invention. The memory device 100 includes an array of non-volatile memory cells 102, an address circuitry 104, and Input/Output (I/O) circuitry 110. In one embodiment the memory array is a NAND Flash memory array. In another embodiment, the memory array is a NOR Flash memory array.

A control circuit 108 is provided to manage memory operations, such as read, write and erase operations. As explained below, one memory operation performed by the memory control circuitry includes an internal data move operation.

The memory device 100 can be coupled to a controller 114 for accessing the memory array 102. The memory device 100 receives control signals across control lines 116 from the controller 114 to control access to the memory array 102. Access to the memory array 102 is directed to one or more target memory cells in response to address signals received across address lines 118. Once accessed in response to the control signals and the address signals, data is written to or read from the memory cells across data, DQ, lines 120.

It will be appreciated by those skilled in the art that additional circuitry and control signals can be provided, and that the memory device of FIG. 1 has been simplified to help focus on the invention. It will be understood that the above description of a memory device is intended to provide a general understanding of the memory and is not a complete description of all the elements and features of a typical memory device.

The non-volatile memory also includes an error detecting code (EDC) circuit 140. As described below, the EDC in one embodiment uses parity bits to detect errors, and in another embodiment uses ECC data provided by the controller 114.

Non-volatile memory devices, such as FLASH memories, often perform an internal data move operation. This operation is performed as part of "housekeeping." That is, data stored in a first memory array location is moved to a second memory array location so that memory operations, such as memory cell erasing, can be performed on the first location.

In prior art memory devices, the data is not read by the controller during the move operation. As such, the ECC circuitry of the controller is not employed during the move to determine if an error exists in the memory data.

In one embodiment, the EDC circuit 140 of the non-volatile memory device 100 uses a parity technique for identifying single bit errors. As such, when data is written to the memory array parity is also stored in the memory. The parity data can be internally generated and stored for later use. The parity data can be stored in the array or in an overhead location. For example, in one embodiment a 512 bit array sector has 16 bits of overhead reserved for the parity data. The parity data can be restricted from external access.

During an internal data move the parity bit is used to detect single bit errors. The memory controller 114 can check the status of an error register 150 to determine if an error was detected while executing the internal move. If an error is detected, the controller can read the data from the memory into a buffer of the controller, perform an ECC operation to correct the error, and write the corrected data back into the memory. The error register can be one or multiple bits long. That is, a simple status flag can be used in one embodiment to indicate that an error was detected.

In another embodiment, the memory device 100 includes an ECC register 160 for storing ECC information provided by the controller. The register can store an indication of the ECC scheme employed by the controller, for example Hamming, BCH or Reed-Solomon coded. In addition to the type of ECC used by the controller, register 160 can store an address, or offset, of the location of the ECC data bytes associated with array data. ECC techniques are well know in the art and are not listed or described in detail herein. It will be understood that embodiments of the present invention can be implemented without limitation to a specific ECC code(s).

The EDC circuit 140 detects errors during internal data move operations using the ECC register 160 information. That is, the EDC uses the identified ECC code and ECC data to detect errors. The memory controller 114 can check the status of an error register 150 to determine if an error was detected while executing the internal move. The error register can be one or multiple bits long. That is, a simple status flag can be used in one embodiment to indicate that an error was detected.

If an error is detected, the controller can read the data from the memory into a buffer of the controller, perform an ECC operation to correct the error, and write the corrected data back into the memory. To reduce the time needed by the controller to correct the error, the error register, in one embodiment, contains multi-bit repair solution data. As such, the controller only needs to execute the repair solution prior to re-writing the data to the memory.

It will be appreciated that there are a wide variety of ECC schemes available for use by the controller. Implementing each of these schemes on the memory device would be cost prohibitive. As such, the memory device may be limited to implementing an EDC technique based on one, or a select few, ECC scheme(s).

Figure 2:
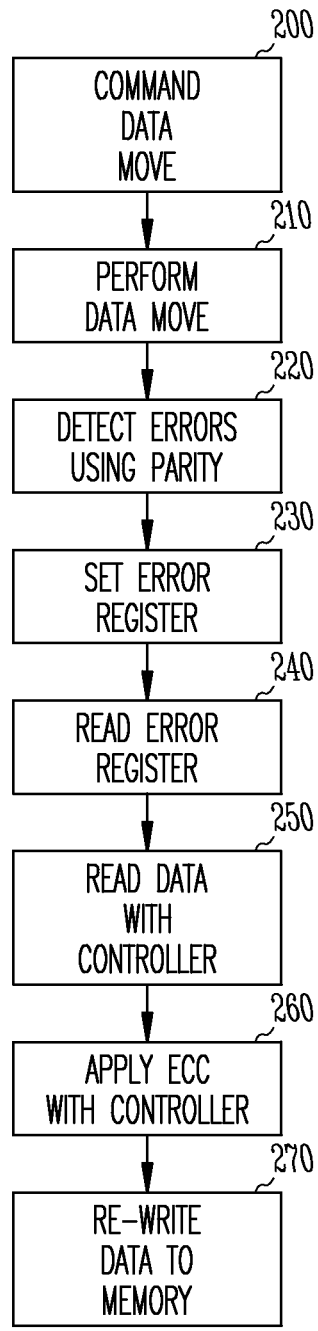
FIG. 2 is a flow chart illustrating embodiments of the present invention.

FIG. 2 is a flow chart illustrating embodiments of the present invention. The memory controller instructs the non-volatile memory to perform an internal data move operation 200. The memory moves data from a first location to a second location within the memory array 210. An error detection operation is performed 220 using parity data stored in the memory. In response to the error detection operation, an error register is set 230 accordingly. Upon completion of the data move, the controller reads the error register 240 to determine if an error was detected. If an error was detected, the controller reads the moved data 250, applies an ECC operation 260 and re-writes the corrected data to the memory 270.

Figure 3:
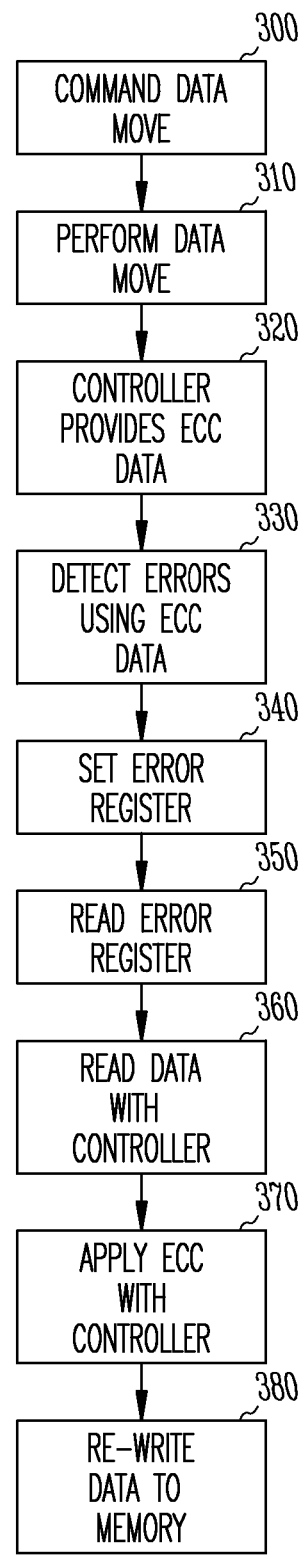
FIG. 3 is a flow chart illustrating additional embodiments of the present invention.

FIG. 3 is a flow chart illustrating additional embodiments of the present invention. The memory controller instructs the non-volatile memory to perform an internal data move operation 300. The memory moves data from a first location to a second location within the memory array 310. The controller provides an indication of the ECC technique implemented by the controller and a location identifier of the ECC data corresponding to the moved data 320. An error detection operation is performed 330 using the ECC data stored in the memory. In response to the error detection operation, an error register is set 340 indicating an error status, and optionally a repair solution for the moved data. Upon completion of the data move, the controller reads the error register 350 to determine if an error was detected, and the repair solution. If an error was detected, the controller reads the moved data 360, applies the repair solution 370 and re-writes the corrected data to the memory 380.

Embodiments of the present invention allow internal data move operations in a non-volatile memory while identifying data errors. The error detection can be implemented by using parity data or ECC data stored in the memory. Results of the error detection can be accessed by a memory controller for data repair operations by the controller.

The invention claimed is:

1. A non-volatile memory device comprising:
    an array of memory cells;
    control circuitry to perform an internal data move operation wherein memory data is moved from a first array location to a second array location in the array of memory cells;
    an error detection circuit to detect, during execution of the internal data move operation, the presence of at least a one bit error in the memory data;
    an error register programmable to indicate an error state of the error detection circuit; and
    an error correction code (ECC) register to store ECC data, wherein the ECC data comprises an indication of a location of ECC data bits corresponding to the memory data.

2. The non-volatile memory device of claim 1, wherein the array of memory cells comprises at least one of NROM memory cells, phase-change memory cells, programmable conductor random access memory cells, latching cells, or magnetic random access memory cells.

3. The non-volatile memory device of claim 1, wherein the error register is operable to contain multi-bit repair solution data.

4. The non-volatile memory device of claim 1, wherein the error correction code (ECC) register is operable to store the indication of the location of ECC data bits as an offset.

5. A memory device comprising:
    an array of memory cells;
    control circuitry to perform an internal data move operation such that memory data is moved from a first array location to a second array location in the array of memory cells;
    an error detection circuit to detect, during execution of the internal data move operation, an error in the memory data as part of the internal data move operation;
    an error register to indicate an error state of the memory data corresponding to detection of an error in the memory data during the internal data move operation; and
    an error correction code (ECC) register to store ECC data and to provide the ECC data to detect an error in the memory data as part of the internal data move operation, wherein the error correction code register is arranged to store an indication of an ECC scheme used by an external memory controller to correct a detected error in the memory data as part of the internal data move operation.

6. The memory device of claim 5, wherein the memory device is arranged to implement one or more ECC schemes selected from a group including a Hamming scheme, a BCH scheme, and a Reed-Solomon scheme.

7. The memory device of claim 5, wherein the ECC register is arranged to store an address of a location of ECC data bytes associated with the memory data.

8. The memory device of claim 5, wherein the error register is operable to contain a repair solution for the moved data.

9. A method comprising:
    detecting within a memory device whether data being moved from a first location to a second location within a memory array of the memory device includes an error, wherein the detecting occurs during execution of moving the data from the first location to the second location; and
    when the detecting determines that the data being moved includes the error, indicating to a controller that the data being moved includes the error, wherein the controller is configured to correct the error and cause corrected data to be written to the memory array.

10. The method of claim 9, wherein indicating to the controller comprises setting an error register responsive to detecting the error.

11. The method of claim 10, wherein the error register further includes an indication of a repair solution.

12. The method of claim 9, wherein detecting whether the data being moved includes an error comprises using parity data stored in the memory device to detect whether the data includes the error.

13. The method of claim 9, further comprising receiving from the controller an indication of an ECC technique implemented by the controller and a location identifier of ECC data corresponding to the data.

14. The method of claim 9, wherein detecting whether the data being moved includes an error comprises using ECC data stored in the memory device to detect whether the data includes an error.

15. The method of claim 9, further comprising storing within the memory device ECC information provided by the controller.

16. The method of claim 15, wherein detecting whether the data being moved includes an error comprises using the ECC information provided by the controller to detect whether the data includes an error.

17. A memory device comprising a memory array, wherein the memory device is configured to:
 detect whether data being moved from a first location to a second location within the memory array includes an error, wherein the detection occurs while the data is being moved; and
 when existence of the error is detected, indicate to a controller that the data being moved includes the error, wherein the controller is configured to correct the error and cause corrected data to be written to the memory array.

18. The memory device of claim 17, wherein the memory device is configured to use parity data stored in the memory device to detect whether the data being moved includes the error.

19. The memory device of claim 17, wherein the memory device is configured to use error correction code (ECC) data stored in the memory device to detect whether the data being moved includes the error.

20. The memory device of claim 17, wherein the memory array includes memory cells, each of the memory cells configured to store a plurality of bits per cell.

21. A method comprising:
 determining whether a memory device has detected, during execution of a data move operation, that the data being moved from a first location to a second location within a memory array of the memory device includes an error; and
 when the memory device has detected that the data being moved includes the error:
  correcting the error; and
  causing corrected data to be written to the memory array.

22. The method of claim 21, further comprising instructing the memory device to move the data from the first location to the second location.

23. The method of claim 21, wherein determining whether a memory device has detected that data being moved from a first location to a second location within a memory array of the memory device includes an error comprises reading an error register of the memory device.

24. The method of claim 23, wherein reading an error register further comprises reading the error register to determine a repair solution and wherein correcting the error comprises applying the repair solution.

25. The method of claim 21, wherein correcting the error comprises:
 reading the data, including the error, into a buffer of a controller; and
 performing an ECC operation on the data, including the error, using the controller.

26. The method of claim 21, further comprising providing to the memory device an indication of an ECC technique and a location identifier of ECC data corresponding to the data.

27. The method of claim 26, wherein the location identifier comprises an address corresponding to the ECC data.

28. The method of claim 21, further comprising providing ECC information to the memory device.

29. A controller comprising:
 control lines to access a memory device, the controller configured to:
  determine, while executing an internal data move operation, whether the memory device has detected that the data being moved from a first location to a second location within a memory array of the memory device includes an error; and
  when the memory device has detected that the data being moved includes an error,
  correct the error; and
  cause corrected data to be written to the memory array.

30. The controller of claim 29, wherein the controller includes a buffer arranged such that when the memory device has detected the error, the controller can read the data from the memory device into the buffer.

31. The controller of claim 29, wherein the controller is configured to check status of an error register of the memory device to determine that the error was detected while moving the data from the first location to the second location.

32. The controller of claim 29, wherein the controller is configured to execute a repair solution contained in an error register of the memory device prior to causing corrected data to be written to the memory array.

33. The controller of claim 29, wherein the controller is configured to provide error detecting code data to the memory device.

* * * * *